(12) United States Patent
Lam

(10) Patent No.: US 9,844,966 B2
(45) Date of Patent: Dec. 19, 2017

(54) CHANGEABLE BOOK SYSTEM

(71) Applicant: Leo Paper Bags Manufacturing (1982) Limited, Kowloon (HK)

(72) Inventor: Cannie Lam, Kowloon (HK)

(73) Assignee: Leo Paper Bags Manufacturing (1982) Limited, Kowloon (HK)

( * ) Notice: Subject to any disclaimer, the term of this patent is extended or adjusted under 35 U.S.C. 154(b) by 0 days.

(21) Appl. No.: 15/351,360

(22) Filed: Nov. 14, 2016

(65) Prior Publication Data

US 2017/0157970 A1 Jun. 8, 2017

Related U.S. Application Data

(63) Continuation of application No. 13/665,927, filed on Oct. 31, 2012, now abandoned.

(51) Int. Cl.
| | |
|---|---|
| *B42D 3/12* | (2006.01) |
| *B42D 1/00* | (2006.01) |
| *G09B 5/06* | (2006.01) |
| *G09B 17/00* | (2006.01) |

(52) U.S. Cl.
CPC .............. *B42D 3/123* (2013.01); *B42D 1/00* (2013.01); *G09B 5/06* (2013.01); *G09B 17/006* (2013.01)

(58) Field of Classification Search
CPC .............................. G09B 17/006; B42D 3/123
USPC ......................................................... 434/317
See application file for complete search history.

(56) References Cited

U.S. PATENT DOCUMENTS

| | | | | |
|---|---|---|---|---|
| 5,910,009 A | * | 6/1999 | Leff ...................... | G09B 5/062 434/236 |
| 2008/0113321 A1 | * | 5/2008 | Kelley ................... | G09B 5/00 434/169 |

* cited by examiner

*Primary Examiner* — Thomas Hong
(74) *Attorney, Agent, or Firm* — Perkins Coie LLP

(57) ABSTRACT

A changeable book system including a book chassis configured to receive a plurality of books. The book chassis includes one or more membrane switches aligned with identifier indicia located on one or more pages of a book when the book is positioned adjacent to the book chassis. A reader may activate one or more membrane switches by pressing the corresponding identifier indicia. Activation of a membrane switch causes the book chassis to perform a function and/or produce a sound.

20 Claims, 4 Drawing Sheets

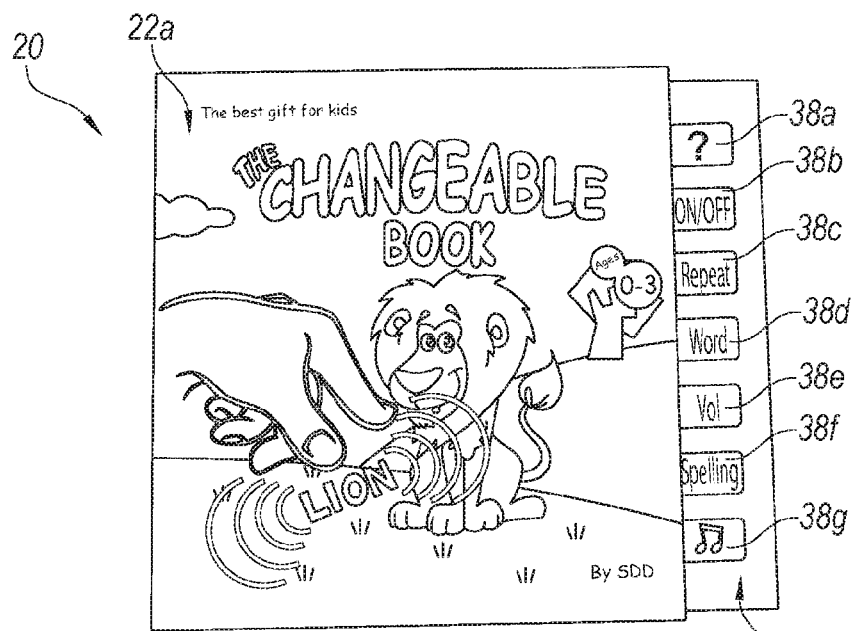
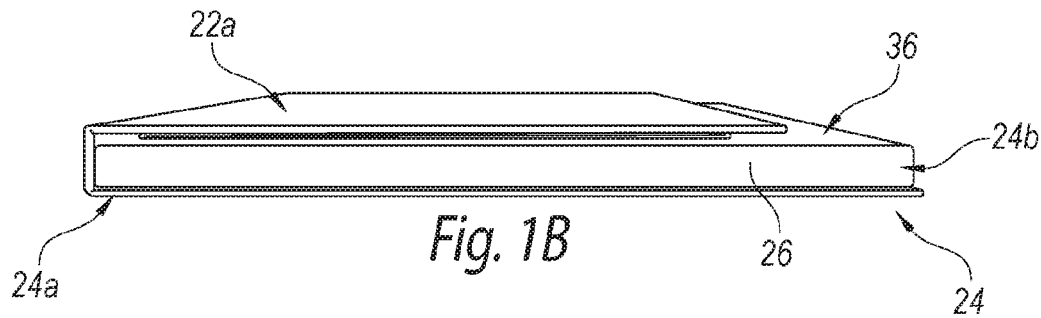
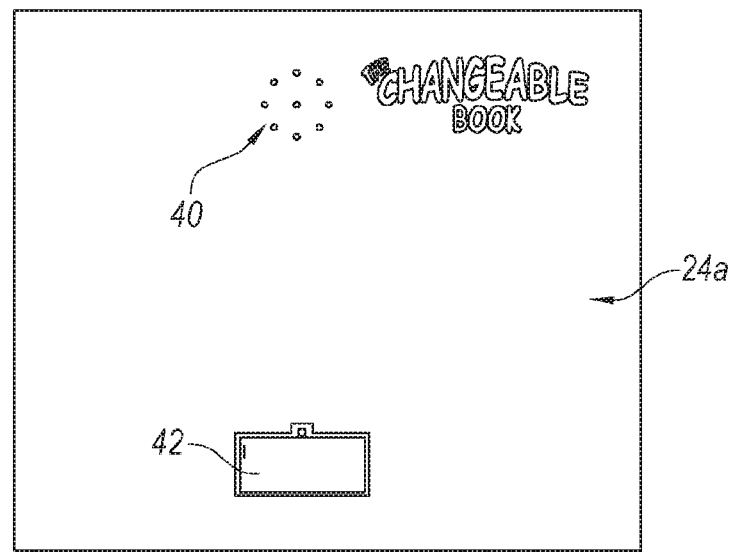

CHANGEABLE BOOK SYSTEM

CROSS-REFERENCE TO RELATED APPLICATIONS

This application is continuation of U.S. patent application Ser. No. 13/665,927, filed Oct. 31, 2012, and titled Changeable Book System, which is incorporated herein by reference in its entirety.

TECHNICAL FIELD

Embodiments of the present invention are directed to a changeable book system, and more particularly to a book chassis configured to produce a sound.

BACKGROUND

Books, primarily children's books, often include a means for interacting with a reader to help hold the reader's attention, such as by producing a sound in response to an action by the reader. Such sounds also provide additional sensory stimuli which aids in the reader's comprehension and memory of the book's contents. Accordingly, children's books are often designed to induce children to read, as well as to keep a child's interest throughout the book. For example, children's books come in a variety of shapes, sizes, and styles, and have been designed with, among other things, decorative and colorful covers, bright illustrations, scratch and sniff areas, pop-up figures, and lift-up flaps. Many of these features in the books are designed to make the books more appealing to youthful readers and to teach children new skills, such as dexterity, memory, or imagination and reasoning.

Developing children continuously learn new cognitive and physical skills. Books have been recognized as helping children with letter and word recognition, as well as improving their small motor skills. The more interactive the user is with a book, both on a cognitive level and with being able to physically manipulate portions of the book, the greater opportunity there is for the user to learn on a variety of levels.

SUMMARY

The present invention provides an interactive book system that overcomes drawbacks in the prior art and provide additional benefits. At least one embodiment of the present disclosure provides a changeable book system that has a book chassis configured for interchangeably receiving a plurality of books. The book chassis includes a receiving area removably supporting and positioning a first book thereon. The plurality of books have at least a first book, the first book having a book-identifier indicium and at least a first page with a page-identifier indicium. The page of the book also has at least a first feature indicium. The book chassis has a first membrane switch positioned adjacent to the receiving area in alignment with the book-identifier indicium, wherein the first membrane switch is activatable to identify the first book positioned on the book chassis when a user presses the book-identifier indicium. A second membrane switch is positioned adjacent to the receiving area in alignment with the page-identifier indicium. The second membrane switch is activatable to identify the first page of the first book when a user presses the page-identifier indicium after activating the first membrane switch. A third membrane switch is positioned in alignment with the first feature indicium. The third membrane switch is activatable to identify a first feature indicium on the first page of the first book when a user presses the first sound indicium after activating the first and second membrane switches.

The book chassis can include a fourth membrane switch positioned in alignment with a function-identifier indicium. The fourth membrane switch is activatable to identify a function associated with the function-identifier indicium when a user presses a first function-identifier indicium.

In one embodiment, the book chassis has a first group of book-identifier switches including a first membrane switch, each switch corresponding to a respective one of the plurality of books. Each of the plurality of books have at least a first page and a second page; and the book chassis has a second group of page-identifier switches including a first page second membrane switch corresponding to a first page and a second page second membrane switch corresponding to a second page. The book chassis may further include a plurality of feature-identifier switches, each page with a plurality of feature-identifier indicium aligned with a respective feature-identifier indicium.

Another embodiment provides a book chassis that has a receiving area configured to interchangeably receive a selected one of a plurality of books. The chassis also has an electronic package that generates a selected audible, visual, or tactile response associated with a selected portion of a chosen page of a chosen book. The chassis has a plurality of membrane switches in communication with the electronic package. The membrane switches include a first membrane switch adjacent to a first portion of the receiving area to be in alignment with a book-identifier indicia on the selected one of the plurality of books to identify the presence of the first book on the receiving area. A second membrane switch is adjacent to a second portion of the receiving area to be in alignment with a page-identifier indicia on the selected page to identify the selected page of the selected book. A third membrane switch positioned is adjacent to a third portion of the receiving area to be in alignment with a sound indicia on the selected page. The electronic package generates the selected sound upon activation of the third membrane switch after activation of the first and second membrane switches.

In some embodiments, the book chassis may further include a fourth membrane switch positioned in alignment with a function-identifier indicium, wherein the fourth membrane switch is activatable to identify a first function indicium when a user presses a first function indicium. The book chassis may also include a border region, wherein the function-identifier indicium is located at the border region.

BRIEF DESCRIPTION OF THE DRAWINGS

FIG. 1A is a front view of a changeable book system in accordance with an embodiment of the present disclosure, where the system has a book chassis shown in a closed position.

FIG. 1B shows a side perspective view of the book chassis of FIG. 1A in a closed position.

FIG. 1C shows a rear view of the book chassis of FIG. 1A.

Figure 2A:
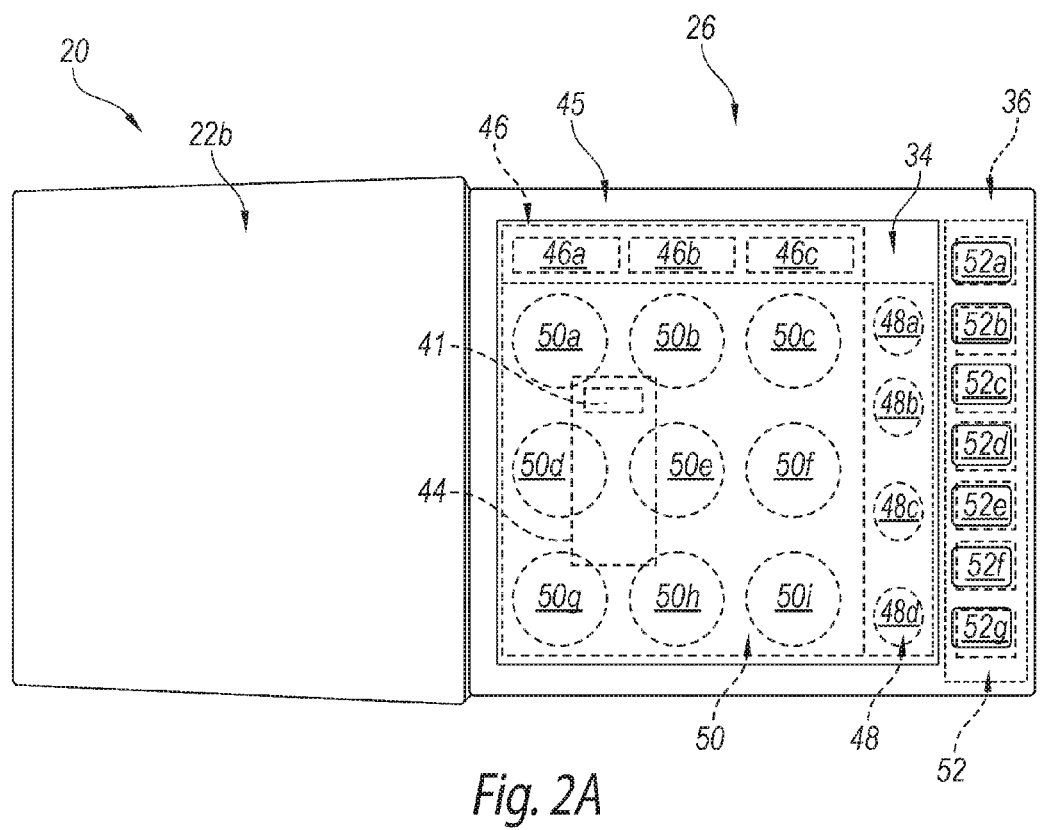
FIG. 2A shows a front view of the book chassis of FIG. 1A in an open position.

Appendix A include photos, drawings and/or other illustrations showing embodiments or features of the changeable book system.

DETAILED DESCRIPTION

A book system 10 in accordance with embodiments of the present disclosure is shown in the drawings for purposes of illustration. The changeable book system 10 comprises a book chassis 20 configured to receive any one of a plurality of books 54. In operation, any one of the plurality of books 54 may be removably positioned on a receiving area 34 of the chassis' main body 26. The book chassis 20 and each book are configured to allow the chassis 20 to identify which book is on the receiving area 34, which page 58 of the book 56 the reader is reading or otherwise interacting with, and which feature on the page the user has selected, so that the chassis 20 can provide a unique sound or other interactive feedback corresponding to the selected feature. In at least one embodiment, a plurality of switches, such as membrane switches, are positioned within the book chassis 20 and aligned with book-identifier, page-identifier, and/or sound- or feature-identifier indicia on one or more pages 58 of a book 56. As explained in greater detail below, the book chassis 20 is configured so that activation of one or more of the switches 45 identifies the particular book, the page of the book and the interactive feature on the page to produce a sound or other interactive response corresponding to the chosen sound and/or feature indicium.

FIGS. 1A-1C depict a book chassis 20 of one embodiment in a "closed" position. The book chassis 20 includes a front cover 22 connected by a binding 28 to a rear cover 24 with a main body 26 therebetween. The front and rear covers 22, 24 include an outside cover and an inside cover 22a, 22b and 24a, 24b, respectively. The rear cover 24 may be contiguous with or separate from the main body 26. As shown in FIG. 1C, the rear outside cover 24b may contain a plurality of apertures aligned with a speaker 40 and/or a battery housing 42 contained in the body 26. The front cover 22, rear cover 24 and/or binding 28 may have artwork thereon and may be laminated to have a glossy surface. In other embodiments, book chassis 20 may not include a front 22 or a rear 24 cover.

Figure 2B:
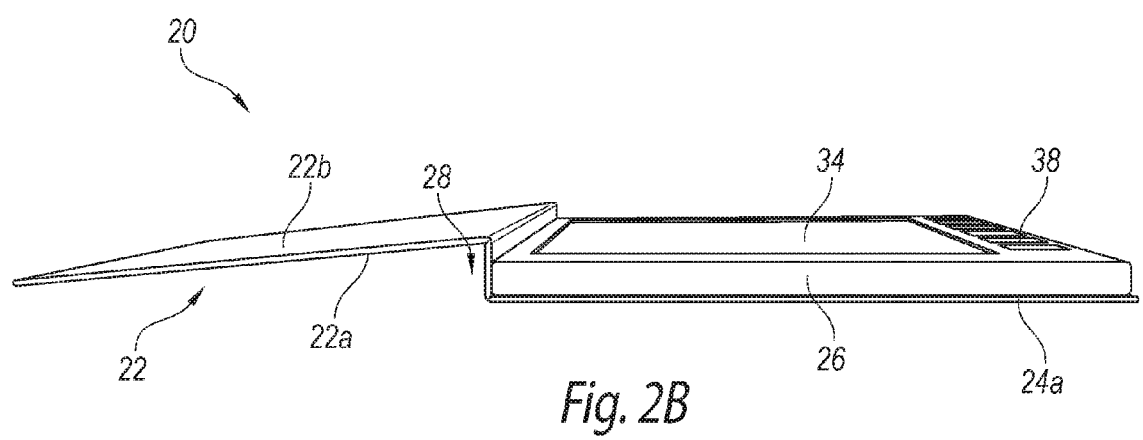
FIG. 2B shows a side perspective view of the book chassis of FIG. 2A in an open position.

As illustrated in FIGS. 2A and 2B, the front cover 22 is moveable between a closed positioned (FIGS. 1A-1C) and an open position (FIGS. 2A-2B) to cover or expose a book receiving area 34 of the chassis' main body 26. The receiving area 34 is surrounded by a border region 36 which may include one or more function-identifier indicia 38a-38g. While illustrated embodiments of the main body 26 show a square-shaped receiving area 34 with a rectangular border region 36, the receiving area 34 and/or border region 36 may comprise other shapes or sizes.

Figure 3:
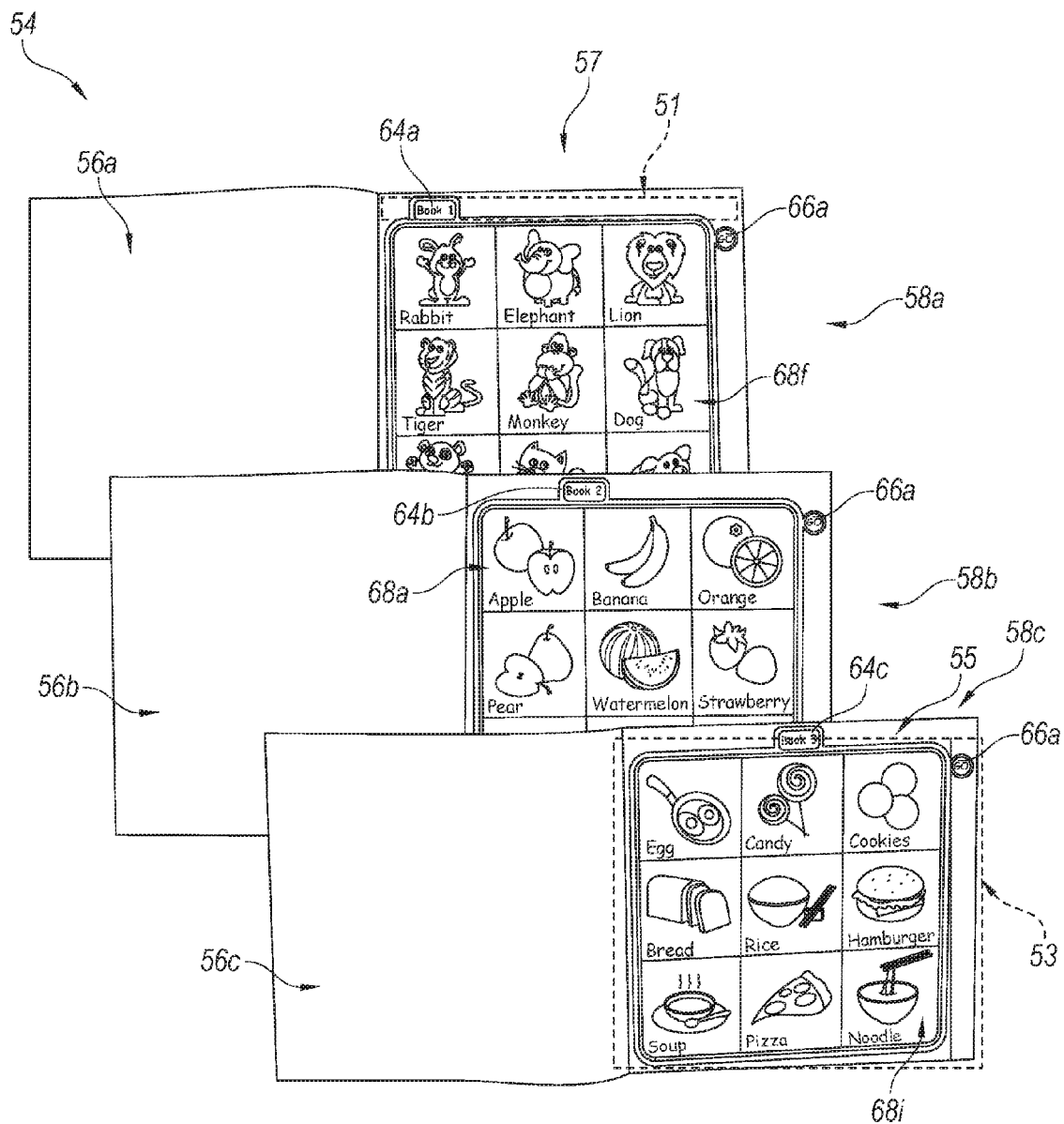
FIG. 3 illustrates a plurality of books interchangeably useable with the book chassis of FIG. 1A.

Referring to FIG. 3, the book system 10 also comprises a plurality of books 54 for placement on the receiving area 34 of the book chassis 20. Although three books are shown, the plurality of books 54 may include more or less than three books. Each book 56 includes one or more pages 58 between a front cover 60 and a rear cover 62. When a chosen book 56 is positioned on receiving area 26, the edge of the book 56 and/or pages 58 is adjacent to function-identifier indicia 38a-38g (explained in greater detail below) so that such indicia are exposed and available while reading. In other embodiments, the book 56 may comprise a single page without a front 60 or rear cover 62.

Each book 56 further includes a plurality of unique identifier indicia 57 positioned in selected locations or regions and used to prompt interaction by the reader with the book while reading. These identifier indicia 57 are used to allow the book chassis 20 to identify which book 54 is on the receiving area 34, which page 58 of the selected book 56 the user is reading or viewing, and which feature on the selected page the user has selected. As used herein, "indicium" or "indicia" refers to any pictorial, tactile, symbolic and/or numerical communicative representation or indicator located on the upper surface of a page 58, front cover 60, or back cover 62 positioned relative to chassis to align with corresponding membrane switches 45 for control of the chassis. Pressing the page 58 at the indicium 57 activates the corresponding membrane switch, causing the book chassis 20 to perform a predetermined function, such as, for example, emitting a sound or other audible, visual, or tactile response corresponding to the selected indicium.

For explanatory purposes, the identifier indicia 57 in each book 56 are grouped into one or more general categories, such as book-identifier indicia 64a-64c, page-identifier indicia 66a-66d, sound or feature-identifier indicia 68a-68i, etc. (FIG. 3). Indicia within the same general category share a common general region on each page 58 of the plurality of books 54. For example, in the embodiment shown in FIG. 3, the book-identifier indicia 64a-64c are located along a top edge region 51 of the book 56 and/or page 58. When page-identifier indicia 66a-66d are located along a side edge region 53 of each page, and the feature-identifier indicia 68a-68i are located in a center region 55 of each page. Each common region is further broken down into unique locations for use in identifying the chosen book and/or to distinguish one book from another. For example, in the embodiment shown in FIG. 3, the book-identifier region 51 is broken down into three unique locations. The book-identifier indicium 64a for a first book 56a ("Book 1") is located in the far left corner of the top edge region 51. The book-identifier indicium 64b ("Book 2") for a second book 56b is located in the middle of the top edge region 51. The book-identifier indicium 64c for a third book 56c ("Book 3") is located in the middle of the top edge region 51. In other embodiments, the set of books 56 may have more or less than three book-identifier indicia, and thus more or less than three unique locations can be provided within the book identifier region 51. Likewise, the book-identifier region 51 may be located anywhere on the page of the book, so long as it doesn't conflict with other regions corresponding to other membrane switch locations. In operation, pressing the page 56 at a book-identifier indicium 64 when the book is properly seated on the chassis' receiving area activates the corresponding membrane switch, causing the electronic package 44 and/or processor 41 to identify which of the three books is positioned on the chassis. The books 56 and associated pages must be flexible enough to allow activation of one switch without inadvertently activating an adjacent switch.

Figure 4A:
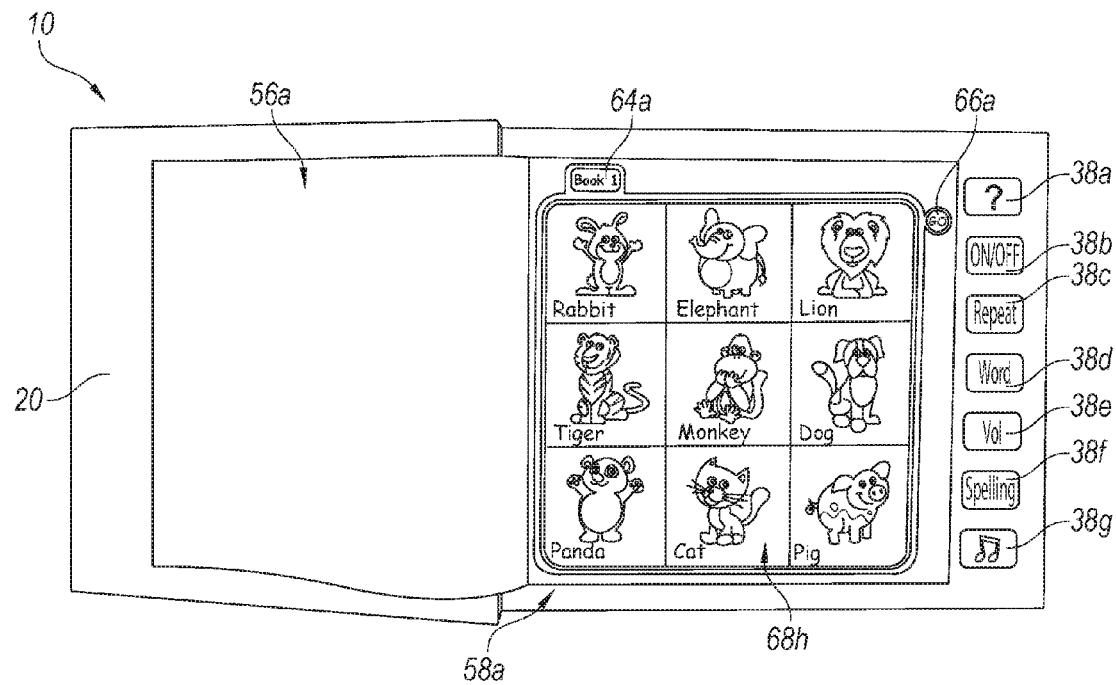
FIG. 4A illustrates a changeable book system with a selected book on the book chassis, wherein the book is open to a first page, in accordance with embodiments of the present invention.
Figure 4B:
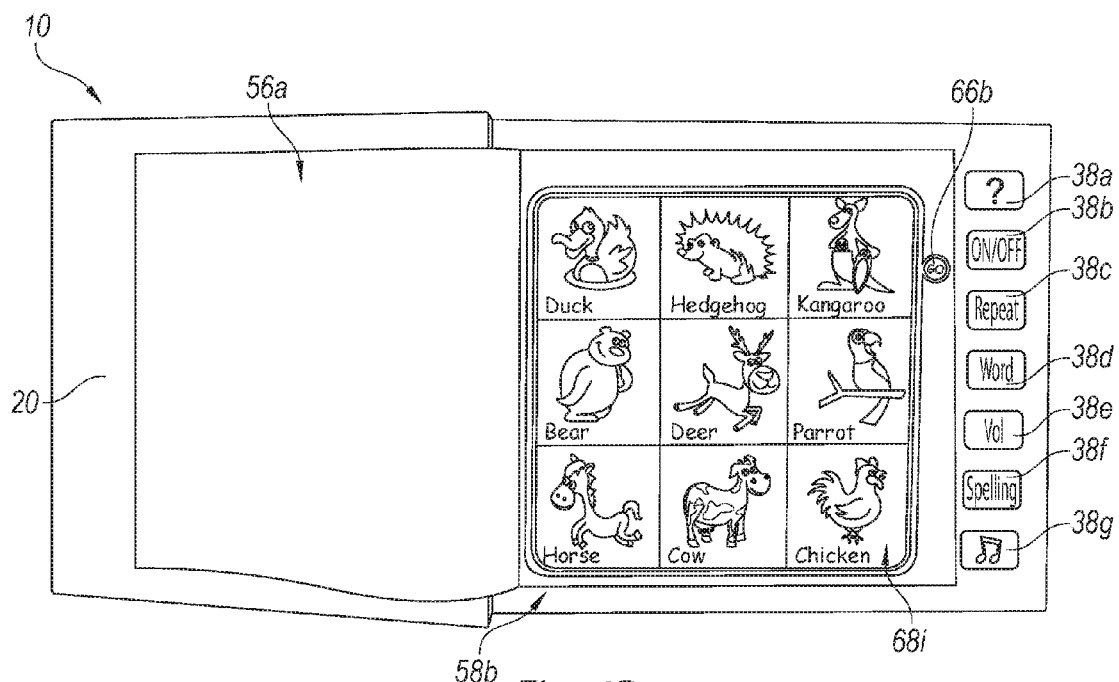
FIG. 4B illustrates a changeable book system with a selected book on the book chassis, wherein the book is open to a second page, in accordance with embodiments of the present invention.

In the embodiment shown in FIGS. 3, 4A and 4B, the common page-identifier region 53 is broken down into four unique locations. The page-identifier indicium 66a (shown as a "Go" prompt) for a first page 58a of each of the books 54 is located at the top of the side edge region 53. The page-identifier indicium 66b (shown as a "Go" prompt) for a second page 58b of each of the books 54 is located out of vertical alignment with the first page-identifier indicia 66a, relative to the receiving area 34 at the side edge region 53 (shown in FIG. 4). Each book 54 has one page-identifier indicium 66 per page, and each book 54 may have more or less than four pages and four page-identifier indicia 66, and thus more or less than four unique locations within the common page-identifier region 53. Likewise, the page-identifier region 53 may be located anywhere on the pages 58 of the books 56. In operation, provided it does not conflict with other regions and associated switches. In operation, when a reader pressing the chosen book's page 56 at a page-identifier indicium 66, this presses and activates the corresponding membrane switch aligned with the selected page-identifier indicium, thereby causing the electronic package 44 and/or processor 41 to identify which page of the book is being viewed by the reader.

A plurality of sound and/or feature identifier-indicia 68a-68i also has unique locations within the common center region 55 of each page of each book. For example, in the embodiment shown in FIG. 3, the center region 55 is broken down into nine unique locations. As best shown by third book 56c for purposes of explanation, an "egg" indicium comprises the top left location of the illustrated page, a "candy" indicium comprises the top center location, a "cookies" indicium comprises the top right location, etc. In other embodiments, book 56 may have more or less than nine feature-identifier indicia per page, and thus more or less than nine unique locations within the common center region 55. Likewise, the feature-identifier common region 55 may be located anywhere on the page of the book, provided is does not conflict with other regions and associated membrane switches. In operation, pressing the page 56 at the feature-identifier indicium 68 activates the corresponding membrane switch in the chassis aligned with that indicium 68, causing the electronic package 44 and/or processor 41 to identify the chosen feature on the chosen page of the chosen book, prompting the book chassis 20 to provide an interactive response (as discussed in greater detail below) corresponding to that chosen feature. For example, the illustrated embodiment shows a selected page of a book that has several features, including a picture of an apple. If a reader presses on the book's page at the image of the apple, the associated pressure will activate a membrane switch aligned with that "apple" indicium 68a. Because the reader had previously selected (i.e., pressed) the correct indicia for the chosen book and has previously selected the correct indicia for the chosen page, when the reader the presses on the page at the chosen feature indicium 68a, the book chassis knows that the reader is pushing on the image of the apple. Accordingly, the book chassis 20 may audibly reproduce the word "apple," spell the word "apple," tell a brief story involving an apple, or provide other interactive feedback related to the apple. FIG. 3 also shows an example of a sound-identifier indicium at 68f, which shows a pictorial representation of a dog. In response to activation of a membrane switch aligned with the "dog" indicium 68f (after selecting the chosen book indicium for "Book 1" and the chosen page indicium for "page 1"), the book chassis 20 may audibly reproduce the word "dog," spell the word "dog," produce the sound of a dog barking, tell a story involving about a dog, and/or provide other interactive feedback related to a dog.

As shown in FIG. 2A, the main body 26 of the book chassis contains an electronic package 44 operatively connected to the membrane switches 45. The electronic package 44 includes an integrated circuit, a processor 41, a speaker 40, and a battery or other power source. When a reader presses an indicium 57 vertically aligned with a membrane switch 45, the selected membrane switch is activated which is recognized and processed by the electronic package's processor 41, causing the book chassis 20 and/or the electronic package 44 to perform a predetermined function.

The membrane switches 45 may be categorized by general function into one or more switch groups which generally correspond to one or more identifier indicia 57 located on book 58. As shown in FIG. 2A, main body 26 includes first, second, third and fourth membrane switch groups 46, 48, 50 and 52 each containing a plurality of membrane switches having a common general function. Membrane switches 45 of the same group are generally grouped in a common area, although the switches may be positioned anywhere throughout the main body 26.

In the illustrated embodiment, the membrane switches 45 includes a group of book-identifier switches 46a-46c positioned to correspond to the top portion of the receiving area adjacent to the border region. Each of the book-identifier switches correspond to a respective area of the books. For example, switch 46a corresponds to "Book 1," switch 46b corresponds to "Book 2" and switch 46c corresponds to "Book 3." Accordingly, the processor 41 of the electronic package 44 can identify which book is on the receiving area based upon which book-identifier switch 46a-46c is activated. After the book-identifier switch has been activated, it does not need to be activated again for subsequent other interactions with that while it is on the chassis' receiving area 34.

As shown in FIGS. 3 and 4A-4B, the membrane switches 45 includes a group of page-identifier switches 48a-48d positioned to correspond to the side portion of the receiving area adjacent to the border region. Each of the page-identifier switches correspond to a respective area of the book pages. For example, switch 48a corresponds to a first page 58a, (denoted by a "Go" prompt in a top-most location of the side portion), switch 48b corresponds to a second page 58b (denoted by a "Go" prompt in a top-center location of the side portion), switch 48c corresponds to a third page 58c (denoted by a "Go" prompt in a bottom-center location of the side portion), and switch 48d corresponds to a fourth page 58d (denoted by a "Go" prompt in a bottom-most location of the side portion). Accordingly, the processor 41 of the electronic package 44 can identify which page of the book is being viewed/interacted with by the reader based upon which page-identifier switch 48a-48d is activated. After the page-identifier switch has been activated, it does not need to activated again for subsequent other interactions with that page, until the reader turns the page or starts with a new book.

Likewise, the membrane switches 45 include a group of feature-identifier switches 50a-50i positioned to correspond to the center portion of the receiving area. Each of the feature-identifier switches correspond to a respective area of the book pages. For example, switch 50a corresponds to the book feature represented in the top-left portion of the center region 55, switch 50b corresponds to the book feature represented in the top-center portion of the center region 55, switch 50c corresponds to the book feature represented in the top-right portion of the center region 55, etc. Accordingly, the processor 41 of the electronic package 44 can identify which feature has been selected by the reader based upon which feature-identifier switch 50a-50i is activated.

In some embodiments, the border region 36 of the book chassis main body 26 may contain an additional fourth group of membrane switches 52a-52g, as shown in FIG. 2A. In other embodiments, fourth membrane switches may be positioned anywhere on or within the main body 26. The fourth membrane switches 52a-52g may align with and thus correspond to function-identifier indicia 38a-38g, respectively, and may perform the general function of sending a function identifier to the processor. Functions performed by the book chassis 20 in response to activation of a fourth membrane switch 52a-52g includes but is not limited to, e.g., turning the book chassis 20 on/off, emitting a predetermined sound from the speaker 40, adjusting the volume of the emitted sound, providing the definition of a word to the reader, spelling a word for the reader, etc. Furthermore, function switches may be correlated to first, second and third group switches such that a function switch may be book, feature, or page specific depending upon which switches 45 have been activated.

In operation of the book system 10, a reader opens the book chassis 20 to expose the receiving area 34, selects one of a plurality of books 54 and places the book 56 on the receiving area 34 so that the periphery of the book 56 substantially corresponds to the periphery of the receiving area 34 within the border region 36. Accordingly, the receiving area 34 and the border region 36 help position and orient the book 56 so that the book's indicia 57 will be properly aligned with the correct membrane switches 45. If the book 56 has more than one page 58, the reader opens the front cover of the book 56 to expose the first page 58a. In the illustrated embodiment, the book-identifier indicia 64a is on the first page 58a, along the horizontal top edge area, although the book-identifier indicia 58 can be on the book's cover or on a different page. To identify the book 56 to the book chassis 20, the reader presses a book-identifier indicium 64 which is aligned with a corresponding first membrane switch 46a in the group of book-identifier switches 46. Sufficient pressure exerted on the membrane switch 46a closes a circuit thereby activating the membrane switch 46a and sending a book identifier signal to the processor corresponding to the identity of the chosen book 56. The processor stores this book identifier signal, and thus the book identity, until a different first book-identifier membrane switch 46 is activated. The processor 41 and/or electronic package 44 may be configured to prompt the reader to act. For example, the electronic package 44 may generate the audible prompt "Press GO" so as to prompt the reader to press the page-identifier indicium 66 on that displayed page.

Next the reader identifies the page 58 by pressing a page-identifier indicium 66 aligned with a second membrane switch 34. Activation of the second membrane switch 34 sends a page identifier signal to the processor corresponding to the identity of the page. Accordingly, the processor 41 and/or the electronics package 44 knows which page of the chosen book the reader is viewing. The processor stores 41 this page signal (in addition to the book signal) until a different second membrane switch 34 is activated. The reader then chooses a feature identified on the page by pressing a feature-identifier indicium 68 aligned with a third membrane switch 50. Activation of a third group membrane switch sends a signal corresponding to the feature-identifier indicium 68 to the processor 41. The processor 41 then processes the book-, page- and feature-identifiers to locate the desired interactive response in the processor memory. For example, the processor 41 may send a signal corresponding to a desired sound to the speaker 40, which then emits the desired sound associated with the chosen feature on the book's page.

FIGS. 4A-4B help illustrate one embodiment of the book system 10 in operation. As shown, a book 54 is positioned adjacent to the receiving area 34. To identify the book 54 to the book chassis 20, the reader opens the book to the first page 58a and presses a book-identifier indicium 64a aligned with a first membrane switch 46a (FIG. 2A). Sufficient pressure exerted on membrane switch 46a closes a circuit thereby activating membrane switch 46a and sending a book identifier signal to the processor to store. Next the reader identifies a first page 58a by pressing a page-identifier indicium 66a aligned with a second membrane switch 48a. Activation of the second membrane switch 48a sends a page identifier signal to the processor for storage. Finally, a reader chooses a sound related to a feature-identifier indicium on the first page 58a, for example a cat, by pressing sound-identifier indicium 68h aligned with a third membrane switch 50h. Activation of a third group membrane switch 50h sends a feature identifier signal to the processor. The processor 41 then processes the book-, page- and feature-identifiers to locate the desired interactive response in the processor memory. For example, the processor 41 sends a signal corresponding to a desired sound to the speaker 40, which then emits the desired sound.

To select a sound or feature on a second page 58b, a reader turns the page and presses a page-identifier indicium 66b on the second page 58b aligned with a second membrane switch 48b. Activation of the second membrane switch 48b sends a page identifier signal to the processor for storage. If a reader does not activate the second membrane switch 48b corresponding to the second page 59, the book chassis will continue to apply the last sent page identifier signal (which in this case was a first page 58a). Likewise, if a reader loads a new book onto the book chassis without identifying the book, the processor will apply the last sent book identifier signal. Finally, a reader may choose a sound related to a sound-identifier indicium on the second page 58b, for example a cow, by pressing sound-identifier indicium 68i aligned with a third membrane switch 50i. Activation of a third group membrane switch 50i sends a sound identifier signal to the processor. The processor then processes the book, page and sound identifiers to locate the desired sound in the processor memory.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:
1. A book system, comprising:
first and second books each having a periphery and having a book-identifier indicium and having at least a page with a page-identifier indicium thereon, wherein the periphery of each of the first and second books have a common periphery shape, and wherein the page having at least a first feature-identifier indicium in a common position for each of the first and second books, the book-identifier indicium of the first book being in a first location relative to the common periphery shape, and the book identifier indicium of the second book having a second location relative to the common periphery shape, wherein the second location is spaced apart and distinct from the first location relative to the common periphery shape; and a book chassis having a receiving area removably supporting and positioning the first book on the book chassis, the receiving area having a border region corresponding to the common periphery shape of the first and second books, wherein the border region is configured to position and orient a selected one of the first or second books with the page-identifier indicium and first feature-identifier indicium in selected positions relative to the receiving area and the book chassis, the book chassis including:

first membrane switches comprising at least first and second book-identifier membrane switches adjacent to the receiving area within the border region and spaced apart from each other, wherein the first book-identifier membrane switch is positioned to be in alignment with the book-identifier indicium of the first book when the first book is on the book chassis within the receiving area, and the first book-identifier membrane switch is out of alignment with the book-identifier indicium of the second book when the second book is on the book chassis within the receiving area, wherein the first book-identifier membrane switch being activatable to identify the first book when the first book is on the book chassis within the receiving area and a user presses the book-identifier indicium of the first book, and the second book-identifier membrane switch being activatable to identify the second book when the second book is on the book chassis within the receiving area and a user presses the book-identifier indicium of the second book;

at least a second membrane switch positioned adjacent to the receiving area spaced apart from the first membrane switches, the second membrane switches being in alignment with the page-identifier indicium of each of the first and second books when the respective first or second book is on the book chassis within the receiving area, wherein the second membrane switch being activatable to identify the page of the first book or second book on the chassis within the receiving area when a user presses the page-identifier indicium after activating the first book-identifier membrane switch for the first book or the second book-identifier member;

at least a third membrane switch spaced apart from the plurality of first membrane switches and positioned in alignment with the first feature-identifier indicium of each of the first and second books when the respective first or second book is on the chassis within the receiving area, wherein the third membrane switch being activatable to identify a first feature-identifier indicium on the page of the first book when a user presses the first feature-identifier indicium after activating the first book-identifier membrane switch and the second membrane switch, and wherein the third membrane switch being activatable to identify a second feature-identifier indicium on the page of the second book when a user presses the second feature-identifier indicium after activating the second book-identifier membrane switch and the second membrane switch; and a fourth membrane switch positioned in alignment with a function-identifier indicium outside the receiving area, wherein the fourth membrane switch being activatable to identify a function associated with the function-identifier indicium when a user presses a first function-identifier indicium.

2. The book system of claim 1 wherein the book chassis includes a front cover moveable between an open and a closed position relative to the receiving area.

3. The book system of claim 1 wherein the first book comprises a single sheet.

4. The book system of claim 1 wherein the receiving area has a shape that corresponds to an outer peripheral shape of the book when the book is in a closed position.

5. The book system of claim 1, further comprising a third book having a periphery with the common periphery shape, the third book having a third book-identifier indicium and having at least a third page with a third page-identifier indicium thereon, and wherein the third page having at least a third feature-identifier indicium in the common position of each of the first and second books, the third book-identifier indicium of the third book being in a third location relative to the common periphery shape different than the first and second locations.

6. The book system of claim 1 wherein:
each of the first and second books has at least a first page and a second page; and
the book chassis has a plurality of second membrane switches including a first one of the plurality of second membrane switches corresponding to the first page of the first book and a second one of the plurality of second membrane switches corresponding to the second page of the first book.

7. The book system of claim 1 wherein the book chassis includes an electronic package.

8. The book system of claim 1, wherein the book chassis contains an electronic package configured to generate a selected first audible, visual, or tactile response associated with a selected feature identifier indicium on the page of the first book when on the chassis within the receiving area and upon activation of the first book-identifier membrane switch, and the electronic package configured to generate a selected second audible, visual, or tactile response different than the first audible, visual, or tactile response and associated with a selected feature identifier indicium on the page of the second book when on the chassis within the receiving area and upon activation of the second book-identifier membrane switch.

9. The book system of claim 1 wherein the book chassis is configured to provide an audible response when one of the membrane switches is activated.

10. A book system, comprising:
first and second books each having a periphery and having a book-identifier indicium and having at least a page with a page-identifier indicium thereon, wherein the periphery of each of the first and second books have a common periphery shape, and wherein the page having at least a first feature-identifier indicium in a common position for each of the first and second books, the book-identifier indicium of the first book being in a first location relative to the common periphery shape, and the book identifier indicium of the second book having a second location relative to the common periphery shape, wherein the second location is spaced apart and distinct from the first location relative to the common periphery shape; and a book chassis having a receiving area removably supporting and positioning the first book on the book chassis, the receiving area having a border region corresponding to the common periphery shape of the first and second books, wherein the border region is configured to position and orient a selected one of the first or second books with the page-identifier indicium and first feature-identifier indicium in selected positions relative to the receiving area and the book chassis, the book chassis including:
- first membrane switches comprising at least first and second book-identifier membrane switches adjacent to the receiving area within the border region and spaced apart from each other, wherein the first book-identifier membrane switch is positioned to be in alignment with the book-identifier indicium of the first book when the first book is on the book chassis within the receiving area, and the first book-identifier membrane switch is out of alignment with the book-identifier indicium of the second book when the second book is on the book chassis within the receiving area, wherein the first book-identifier membrane switch being activatable to identify the first book when the first book is on the book chassis within the receiving area and a user presses the book-identifier indicium of the first book, and the second book-identifier membrane switch being activatable to identify the second book when the second book is on the book chassis within the receiving area and a user presses the book-identifier indicium of the second book;
- at least a second membrane switch positioned adjacent to the receiving area spaced apart from the first membrane switches, the second membrane switches being in alignment with the page-identifier indicium of each of the first and second books when the respective first or second book is on the book chassis within the receiving area, wherein the second membrane switch being activatable to identify the page of the first book or second book on the chassis within the receiving area when a user presses the page-identifier indicium after activating the first book-identifier membrane switch for the first book or the second book-identifier member; and
- at least a third membrane switch spaced apart from the plurality of first membrane switches and positioned in alignment with the first feature-identifier indicium of each of the first and second books when the respective first or second book is on the chassis within the receiving area, wherein the third membrane switch being activatable to identify a first feature-identifier indicium on the page of the first book when a user presses the first feature-identifier indicium after activating the first book-identifier membrane switch and the second membrane switch, and wherein the third membrane switch being activatable to identify a second feature-identifier indicium on the page of the second book when a user presses the second feature-identifier indicium after activating the second book-identifier membrane switch and the second membrane switch.

11. The book system of claim 10 wherein the book chassis includes a front cover moveable between an open and a closed position relative to the receiving area.

12. The book system of claim 10 wherein the receiving area has a shape that corresponds to an outer peripheral shape of the book when the book is in a closed position.

13. The book system of claim 10, further comprising a third book having a periphery with the common periphery shape, the third book having a third book-identifier indicium and having at least a third page with a third page-identifier indicium thereon, and wherein the third page having at least a third feature-identifier indicium in the common position of each of the first and second books, the third book-identifier indicium of the third book being in a third location relative to the common periphery shape different than the first and second locations.

14. The book system of claim 10 wherein:
each of the first and second books has at least a first page and a second page; and
the book chassis has a plurality of second membrane switches including a first one of the plurality of second membrane switches corresponding to the first page of the first book and a second one of the plurality of second membrane switches corresponding to the second page of the first book.

15. The book system of claim 10 wherein the book chassis includes an electronic package.

16. The book system of claim 10, wherein the book chassis contains an electronic package configured to generate a selected first audible, visual, or tactile response associated with a selected feature identifier indicium on the page of the first book when on the chassis within the receiving area and upon activation of the first book-identifier membrane switch, and the electronic package configured to generate a selected second audible, visual, or tactile response different than the first audible, visual, or tactile response and associated with a selected feature identifier indicium on the page of the second book when on the chassis within the receiving area and upon activation of the second book-identifier membrane switch.

17. The book system of claim 10 wherein the book chassis is configured to provide an audible response when one of the membrane switches is activated.

18. A book system, comprising:
- first and second books each having a periphery and having a book-identifier indicium and having at least a page with a page-identifier indicium thereon, wherein the page having at least a first feature-identifier indicium in a common position for each of the first and second books; and
- a book chassis having a receiving area removably supporting and positioning the first book on the book chassis, the receiving area having a border region corresponding to a shape of the periphery of each of the first and second books, wherein the border region is configured to position and orient a selected one of the first or second books relative to the receiving area, the book chassis including:
  - first membrane switches comprising at least first and second book-identifier membrane switches adjacent to the receiving area within the border region and spaced apart from each other, wherein the first book-identifier membrane switch is positioned to be in alignment with the book-identifier indicium of the first book when the first book is on the book chassis within the receiving area, and the first book-identifier membrane switch is out of alignment with the book-identifier indicium of the second book when the second book is on the book chassis within the receiving area, wherein the first book-identifier membrane switch being activatable to identify the first book when the first book is on the book chassis within the receiving area and a user presses the book-identifier indicium of the first book, and the second book-identifier membrane switch being activatable to identify the second book when the second book is on the book chassis within the receiving area and a user presses the book-identifier indicium of the second book;

at least a second membrane switch positioned adjacent to the receiving area spaced apart from the first membrane switches, the second membrane switches being in alignment with the page-identifier indicium of each of the first and second books when the respective first or second book is on the book chassis within the receiving area, wherein the second membrane switch being activatable to identify the page of the first book or second book on the chassis within the receiving area when a user presses the page-identifier indicium after activating the first book-identifier membrane switch for the first book or the second book-identifier member; and at least a third membrane switch spaced apart from the plurality of first membrane switches and positioned in alignment with the first feature-identifier indicium of each of the first and second books when the respective first or second book is on the chassis within the receiving area, wherein the third membrane switch being activatable to identify a first feature-identifier indicium on the page of the first book when a user presses the first feature-identifier indicium after activating the first book-identifier membrane switch and the second membrane switch, and wherein the third membrane switch being activatable to identify a second feature-identifier indicium on the page of the second book when a user presses the second feature-identifier indicium after activating the second book-identifier membrane switch and the second membrane switch.

19. The book system of claim 18 wherein the receiving area has a shape that corresponds to an outer peripheral shape of the first and second books when in a closed position.

20. The book system of claim 18, further comprising a third book having a third book-identifier indicium and having at least a third page with a third page-identifier indicium thereon, and wherein the third page having at least a third feature-identifier indicium in the common position of each of the first and second books, the third book-identifier indicium of the third book being in a third location relative to the common periphery shape different than the first and second locations.

* * * * *